United States Patent [19]

Camboulives et al.

[11] 4,398,864

[45] Aug. 16, 1983

[54] SEALING DEVICE BETWEEN TWO ELEMENTS OF A TURBOMACHINE

[75] Inventors: André A. M. L. Camboulives, Savigny sur Orge; Claude C. Hallinger, Le Mee sur Seine; Roger A. J. Vandenbroucke, Antony, all of France

[73] Assignee: Societe Nationale d'Etude et de Construction de Moteurs d'Aviation, "S.N.E.C.M.A.", Paris, France

[21] Appl. No.: 145,022

[22] Filed: Apr. 30, 1980

[30] Foreign Application Priority Data

May 2, 1979 [FR] France ............................. 79 11527

[51] Int. Cl.³ ..................... F01D 25/26; F01D 9/00
[52] U.S. Cl. ............................ 415/134; 277/57
[58] Field of Search ................... 277/57, 53, 236; 415/134, 135

[56] References Cited

U.S. PATENT DOCUMENTS

| | | | |
|---|---|---|---|
| 1,313,649 | 8/1919 | Steenstrup | 415/134 |
| 2,863,634 | 12/1958 | Chamberlin et al. | 415/134 |
| 3,497,046 | 2/1970 | Schilling | 277/57 |
| 3,841,643 | 10/1974 | McLean | 277/57 |
| 4,063,845 | 12/1977 | Allen | 415/134 |
| 4,184,689 | 1/1980 | Brodell et al. | 415/134 |

FOREIGN PATENT DOCUMENTS

| | | |
|---|---|---|
| 1426864 | 3/1969 | Fed. Rep. of Germany ........ 277/57 |
| 2228967 | 6/1974 | France . |
| 2246782 | 2/1975 | France . |
| 1126468 | 9/1968 | United Kingdom . |
| 1534660 | 12/1978 | United Kingdom . |

*Primary Examiner*—Robert I. Smith
*Attorney, Agent, or Firm*—Oblon, Fisher, Spivak, McClelland & Maier

[57] ABSTRACT

A sealing device disposed between two turbomachine elements traversed by gases, particularly between a combustion chamber and a high pressure turbine nozzle support. The device includes an independent collar supported by first and second bearing surfaces on the elements which are to be connected in leaktight manner, the collar being constructed of a material having a thermal expansion coefficient which is different from that of the elements which it interconnects so as to ensure a leaktight connection between the elements.

9 Claims, 5 Drawing Figures

SEALING DEVICE BETWEEN TWO ELEMENTS OF A TURBOMACHINE

BACKGROUND OF THE INVENTION

1. Field of the Invention

The present invention is directed to a sealing device positioned between two elements of a turbomachine.

2. Description of the Prior Art

In order to ensure optimal control of the rate of leakage of cooling air, which is particularly critical on small engines, and of the migration of hot gases at the junction of a combustion chamber and a high pressure distributor support housing in a turbomachine, an effective seal must be created between these two elements.

The elements at the junction of the turbine nozzle and the combustion chamber most often have large relative axial and radial displacements. These displacements are generally created primarily by temperature differences between the elements in transitory operation and by differences in the expansion coefficients of the materials.

The deviations in stabilized operation are themselves less important, although they too are a function of the technology chosen. It should also be noted that these relative displacements in transitory and stabilized operation are not identical from one engine to the next as a result of manufacturing tolerances.

Leaktightness is generally assured by a fork-shaped assembled device, as shown by reference numerals 1 and 2 in FIG. 1, which represents a longitudinal cross-section of a portion of a turbomachine, the combustion chamber 3 of which is connected to support housing 4 of a turbine nozzle 5 by means of the assembly device. This fork-shaped assembled device requires narrowed adjustment tolerances, without it thereby being possible, in most cases, to control totally the operating play of the elements present and thus the rate of leakage.

There also exists a sealing device as represented in FIG. 2, in which combustion chamber 3 is connected to support housing 4 for turbine nozzle 5 by means of a fixed or movable side plate device 6 and 7. However, the side plate joint assembled apparatus requires still stricter and thus more costly tolerances while the diversity of the elements entails a cumulation of the number of tolerances (albeit small when taken individually) which is incompatible with the reduced, or totally absent, play necessary for satisfactory leaktightness.

A leaktight connection device which includes flanges and bolts is also known. Such a bolted device is simpler, but heavier, and in operation generates severe mechanical stress and does not always enable assembly and disassembly requirements to be met.

SUMMARY OF THE INVENTION

The improved seal device under the invention has, as one object thereof, the elimination of these problems.

Since certain areas of the high pressure turbine nozzle support housing and of the combustion chamber reach very similar temperatures during operation, it is possible, by choosing different materials for these elements, or materials having a different expansion coefficient, to limit, or even eliminate altogether, the radial deviation between these elements during operation, using the "fork" system. But in most cases, materials acceptable for the environment, even if different, often have very similar expansion coefficients, and the clearances and tolerances necessary for manufacture and assembly do not assure leaktightness through the simple difference in expansion of the parts involved. Thus the improved device of the present invention was derived.

In accordance with the invention, the sealing device includes an independent collar supported by bearing surfaces contacting the elements to be connected in leaktight manner, such collar being constructed from material having a lower expansion coefficient than the two elements to be joined.

In operation, the collar ensures compression around the entire periphery of the high pressure turbine nozzle support upstream and against a flange downstream the chamber, thereby assuring an effective seal between the hot gases and the cooling air.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
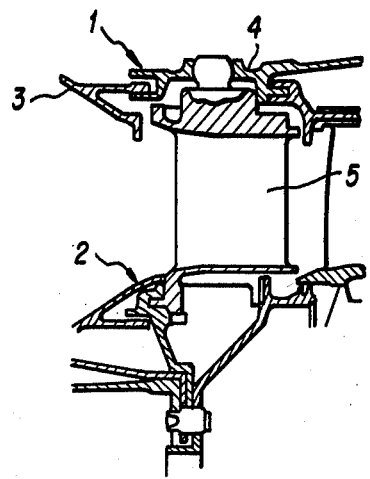
FIG. 1 is a longitudinal cross-section view of a turbomachine having a known "fork" leaktight assembly.
Figure 2:
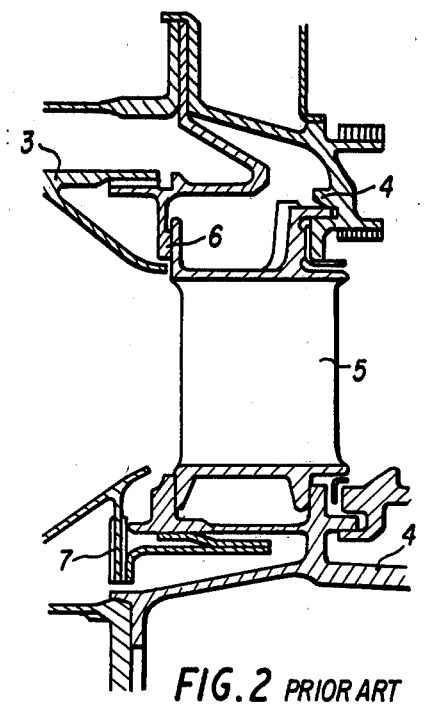
FIG. 2 is a longitudinal cross-section view of a turbomachine having a known side-plate leaktight assembly.
Figure 3:
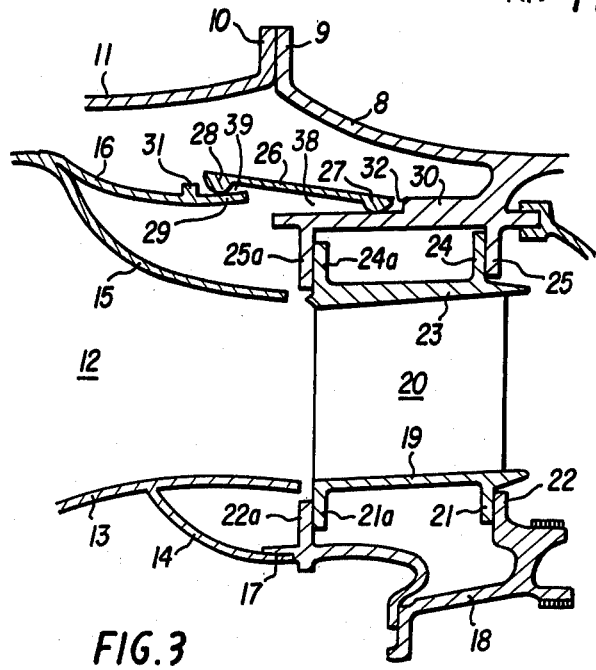
FIG. 3 is a longitudinal cross-section view of the sealing device of the present invention, mounted between a combustion chamber and a high pressure turbine nozzle support.

FIG. 3 shows a part of a turbomachine located to the right of the high-pressure turbine nozzle, including a turbine housing 8 fastened by flanges 9 and 10 to a housing 11 of a combustion chamber 12 having an internal mixer or wall 13 equipped with a collar 14 and an external mixer 15 equipped with a collar 16. Collar 14 of internal mixer 13 is fastened at point 17 to a labyrinth bracket 18, to which is attached the lower heel 19 of a blade 20 of the high pressure turbine nozle, the lower heel having two bearing surfaces 21, 21a forming a seal with flanges 22, 22a of labyrinth bracket 18. Blade 20 has an upper heel 23 having two bearing surfaces 24, 24a forming a seal with flanges 25, 25a of support housing 30 connected to turbine housing 8.

To ensure leaktightness in accordance with the invention, a collar 26 is provided between collar 16 of external mixer 15 of the combustion chamber and turbine nozzle support housing 30, such collar 26 having a conical shape and including a downstream spherical bearing surface 27 contacting an exterior bearing surface portion 38 of support housing 30 of turbine nozzle 20, and an upstream spherical bearing surface 28 contacting an exterior surface portion 39 of part 29 of collar 16 of external mixer 15. Seal collar 26 may also be of cylindrical or spherical form, just as bearing surfaces 27, 28 may be cylindrical.

Collar 26 has a low expansion coefficient, lower than that of collar 16 of the external mixer and of turbine nozzle support 30. Collar 26 is mounted with a certain degree of clearance upon the bearing surfaces of turbine nozzle support 30 and combustion chamber flange 29. Shoulders 31, 32 serve to limit the axial sliding of collar 26 and to prevent accidental dislocation.

The relative contraction of collar 26 with respect to turbine support 30 and combustion chamber flange 29 can be perfectly uniform, with the ring deforming concentrically with respect to itself. In the case where one of the two support elements, particularly the chamber, expands more than the other, tipping does indeed occur around bearing surfaces 27 or 28 with the ring then deforming in an umbrella shape. Assembly may be effected under a heated condition, so that collar 26 is expanded and fitted over the diameters of the turbine nozzle and the chamber in a hoop-like manner.

In cold assembly of collar 26, clearances are calculated so as to enable sliding mounting of collar 26 over the turbine nozzle and of the chamber into the collar. Seal collar 26 is slid onto the cylindrical bearing surface of turbine nozzle support 30. Flange 29 of the combustion chamber is then fit within the internal diameter of collar 26. Lastly, flanges 9 and 10 of the housing are bolted together. The seal is imperfect at start-up, but with turbine nozzle 20 and the combustion chamber expanding very quickly, collar 26 closes up rapidly to ensure leaktightness.

Figure 4:
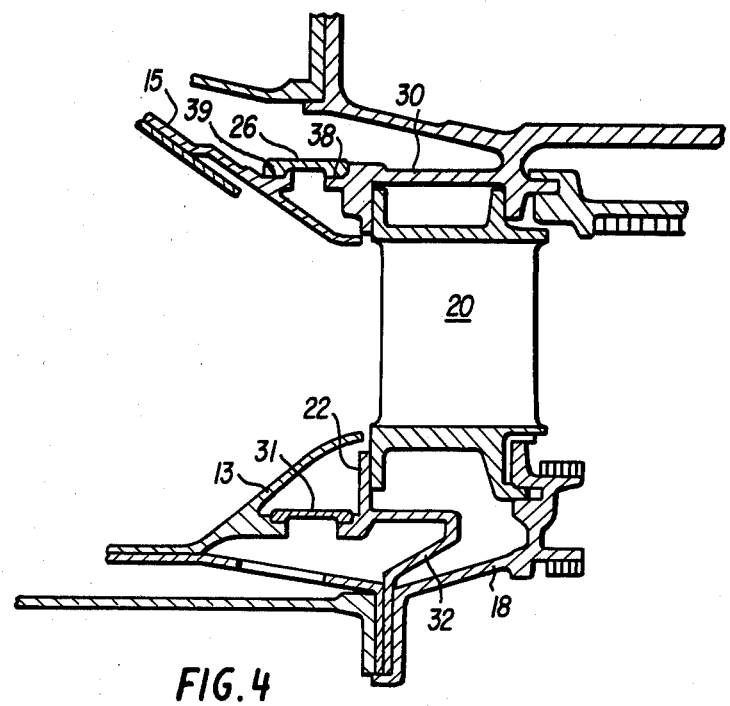
FIG. 4 is a second embodiment of the sealing device represented in FIG. 3.

In FIG. 4, a variant of the sealing device has been represented in which in addition to collar 26 disposed between external mixer 15 and turbine nozzle support 30, another collar 31 is provided and disposed against internal mixer 13 of the combustion chamber and a flange 32 integral with labyrinth bracket 18.

Figure 5:
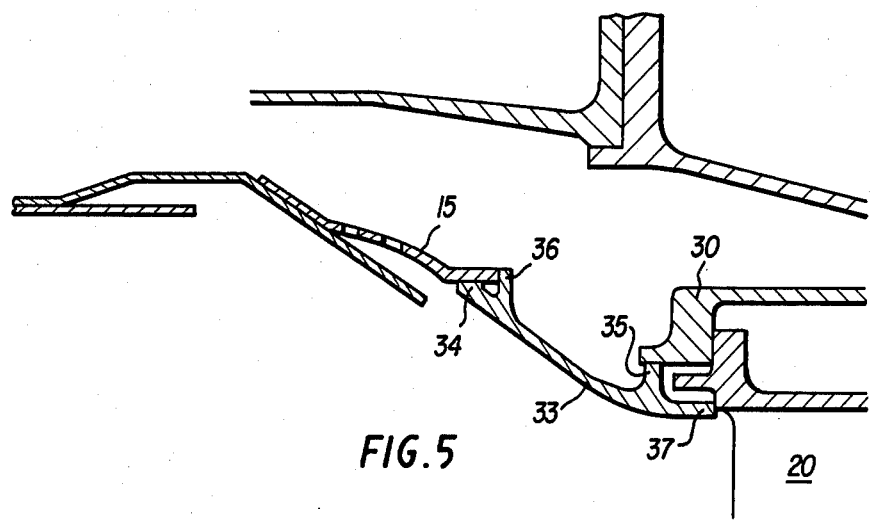
FIG. 5 is a third embodiment of the sealing device of the present invention, in which the collar is disposed on the inside and has a high expansion coefficient.

In the embodiment represented in FIG. 5, a collar 33 is disposed internally upon the bearing surfaces of turbine nozzle support 30 and external mixer 15 of the combustion chamber. In this case, collar 33 has a higher expansion coefficient than the two elements 15 and 30 which it connects. As in the preceding example, collar 33 is equipped with bearing surfaces 34 and 35 and stops 36 and 37, contacting the combustion chamber and turbine nozzle support 30. In this manner, upon thermic expansion of collar 33, the latter is pressed against the two elements which it interconnects.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A sealing device for sealing gases within a turbomachine comprising:
   an axially extending collar disposed within said turbomachine;
   first and second bearing surfaces integral with and protruding from said axially extending collar;
   a combustion chamber wall having a collar member with an exterior surface portion in contact with said first bearing surface;
   a turbine nozzle housing having an exterior surface portion in contact with said second bearing surface wherein said axially extending collar further comprises a material having a lower coefficient of thermal expansion than said exterior surface portion of said collar member of said combustion chamber and said exterior portion of said turbine nozzle support housing such that said gases are sealed within said turbomachine between said combustion chamber wall and said support housing by said axially extending collar.

2. A device according to claim 1, wherein said axially extending collar further comprises a hoop shape and wherein said collar is expanded while heated and subsequently fitted onto said combustion chamber and said turbine nozzle support housing in said hoop form.

3. A device according to claim 1, wherein said contact between said first and second bearing surfaces and said wall and said support housing further comprises a loose contact and wherein said axially extending collar is mounted while cold so as to form clearances enabling sliding mounting of said axially extending collar onto said turbine nozzle support and sliding mounting of said chamber into said axially extending collar.

4. A device according to claim 1, said first and second bearing surfaces each further comprising spherical bearing surfaces.

5. A device according to claim 1, said first and second bearing surfaces each further comprising upper and lower cylindrical bearing surfaces.

6. A device according to claim 1, said axially extending collar further comprising a conical shape.

7. A device according to claim 1, said axially extending collar further comprising a cylindrical shape.

8. A device according to claim 1, said axially extending collar further comprising an arcuate shape.

9. A device according to claim 1 wherein said first and second bearing surfaces are disposed at substantially opposite axial ends of said axially extending collar.

* * * * *